March 26, 1957 W. G. ROLL ET AL 2,786,928
THERMOSTATICALLY CONTROLLED COOKING APPLIANCE
Filed July 28, 1952 5 Sheets-Sheet 1

INVENTORS
WILLIAM G. ROLL
ARTHUR V. RAND

BY William C. Babcock ATTORNEY

March 26, 1957 W. G. ROLL ET AL 2,786,928
THERMOSTATICALLY CONTROLLED COOKING APPLIANCE
Filed July 28, 1952 5 Sheets-Sheet 2
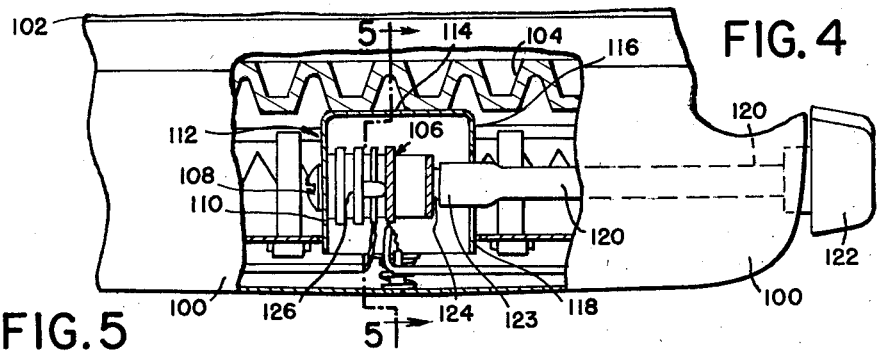
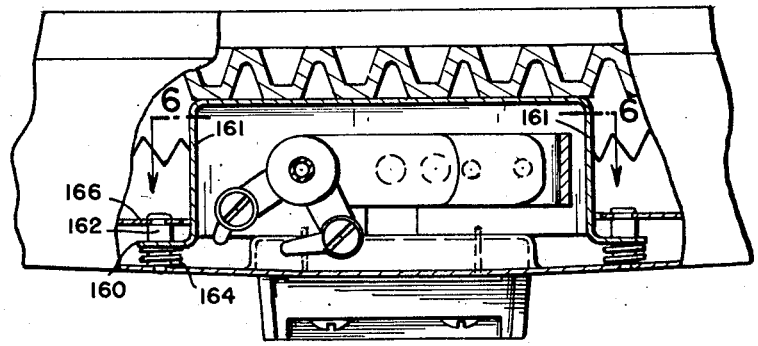
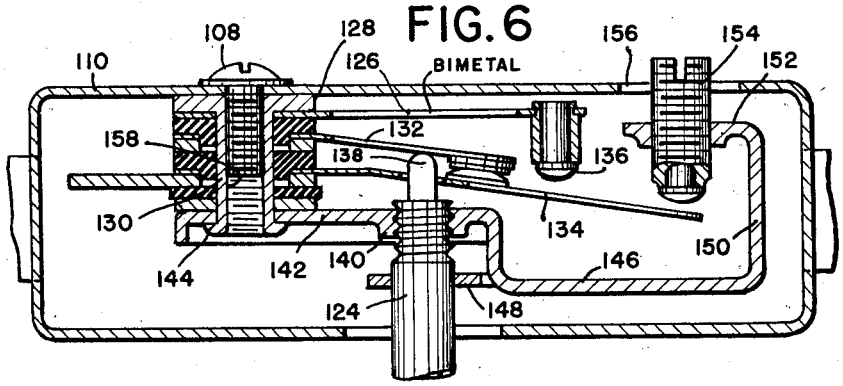
INVENTORS
WILLIAM G. ROLL
ARTHUR V. RAND
BY William C. Babcock ATTORNEY March 26, 1957 W. G. ROLL ET AL 2,786,928
THERMOSTATICALLY CONTROLLED COOKING APPLIANCE
Filed July 28, 1952 5 Sheets-Sheet 3
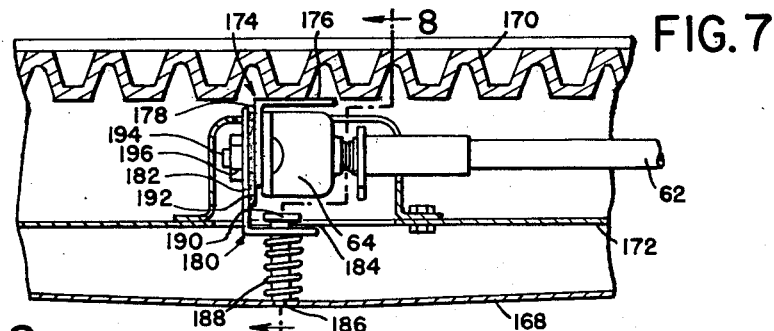
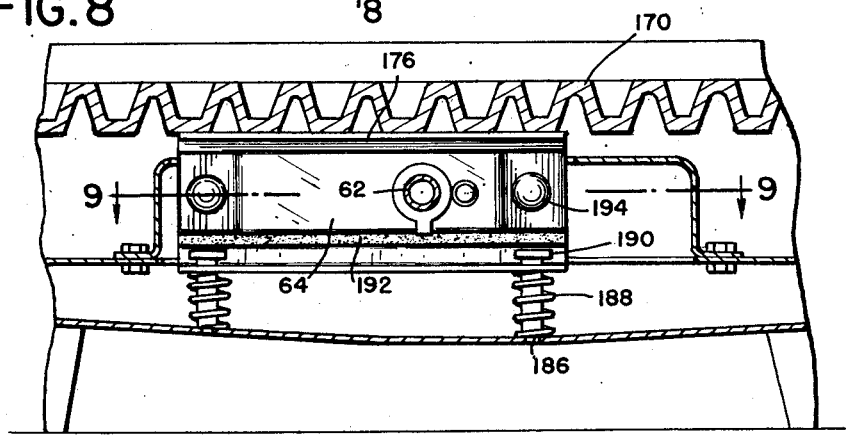
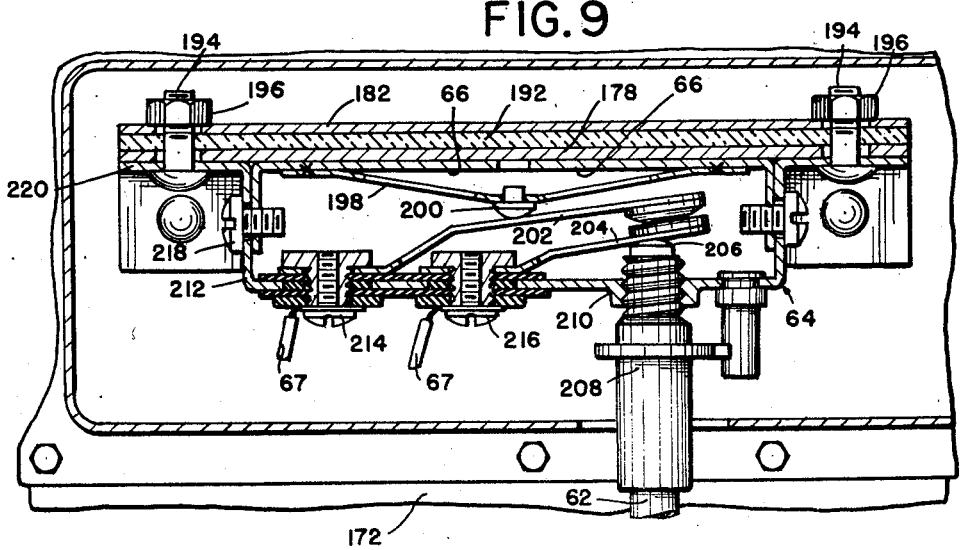
INVENTORS
WILLIAM G. ROLL
ARTHUR V. RAND
BY William C. Babcock ATTORNEY INVENTORS
WILLIAM G. ROLL
ARTHUR V. RAND
BY *William C. Babcock* ATTORNEY

INVENTORS
WILLIAM G. ROLL
ARTHUR V. RAND

BY William C. Babcock ATTORNEY

2,786,928
Patented Mar. 26, 1957

2,786,928

THERMOSTATICALLY CONTROLLED COOKING APPLIANCE

William G. Roll, New Brighton, and Arthur V. Rand, Minneapolis, Minn., assignors to General Mills, Inc., a corporation of Delaware Application July 28, 1952, Serial No. 301,228

14 Claims. (Cl. 219—19)

The present invention relates to cooking appliances of the waffle baker-sandwich grill type and more particularly to improvements in the thermostatic controls for such a device.

Cooking appliances of the above type are well known in which provision is made for a change in the cooking plate. For example, reversible or interchangeable cooking plates may be used, which provide a waffle-baking surface on the one hand, or a flat sandwich-grilling surface on the other. These plates are readily removable from the appliance and are latched in cooking position in various known manners. It has also been suggested in connection with such a device that a thermostat, for controlling the temperature of the removable cooking plate, be resiliently supported within the appliance so that it is urged under spring tension against the bottom surface of the cooking plate to be controlled. The resilient mounting accordingly insures contact of the thermostat with the cooking surface in spite of variations in manufacturing dimensions.

In these prior devices, however, it is desirable to have the control shaft for the thermostat extend out through one of the side walls of the appliance. This requires that the shaft in general be parallel to the plane of the cooking surface itself. Since the thermally responsive portion of the thermostatic switch customarily has been placed in the plane of the cooking surface and immediately adjacent thereto, and since such a thermally responsive member in most thermostatic switches causes movement of switch contacts in a plane perpendicular thereto, it will be understood that the control shaft in such a situation lies at right angles to the direction of movement and adjustment of the switch contacts. This angular relation requires the use of extra parts to provide a mechanical connection between the horizontal control shaft and the vertically movable adjustable contact. The extra mechanical connections not only involve additional cost but may also introduce the possibility of erroneous operation.

With these problems of the prior art in view, it is one object of the present invention to provide an improved combination of removable cooking plate and thermally responsive control switch in such an appliance.

A further object is the provision of a cooking appliance in which the thermally responsive member of the control circuit lies in a plane angularly intersecting or perpendicular to the plane of the cooking plate itself.

Still another object is the provision of an improved thermostat assembly for such a cooking appliance in which a heat-conducting bracket provides a thermal path between the cooking plate and thermally responsive portion of the control switch in angularly related planes.

Another object is the provision of an improved thermostat assembly.

A further object is the provision of a cooking appliance in which the thermostatic control unit includes a heat-conducting bracket or element, and in which shielding means is provided for the thermostat or the bracket to minimize conduction of heat to or away from the thermally responsive portion of the switch by either the heating element of the cooking appliance or the support means for the thermostat.

Other objects and advantages will be apparent from the following specification in which various embodiments of the invention are described. In the drawings which accompany this specification, and in which like reference characters indicate like parts, Figure 1 is a side elevation of a cooking appliance according to the invention, with certain parts broken away and other portions shown in section for clearness.

Fig. 4 is a partial side elevation similar to Fig. 1, showing a modified form of the invention.

Fig. 5 is a partial sectional view on the line 5—5 of Fig. 4.

Fig. 6 is a sectional view on the line 6—6 of Fig. 5 showing details of the thermal switch utilized in this modification of the invention.

Fig. 7 is a partial view similar to Fig. 1 of a further modification according to the invention.

Fig. 8 is a partial sectional view on the line 8—8 of Fig. 7.

Fig. 9 is a sectional view on the line 9—9 of Fig. 8 showing details of the thermal switch used in the embodiment of Figs. 7 and 8.

Figure 1:
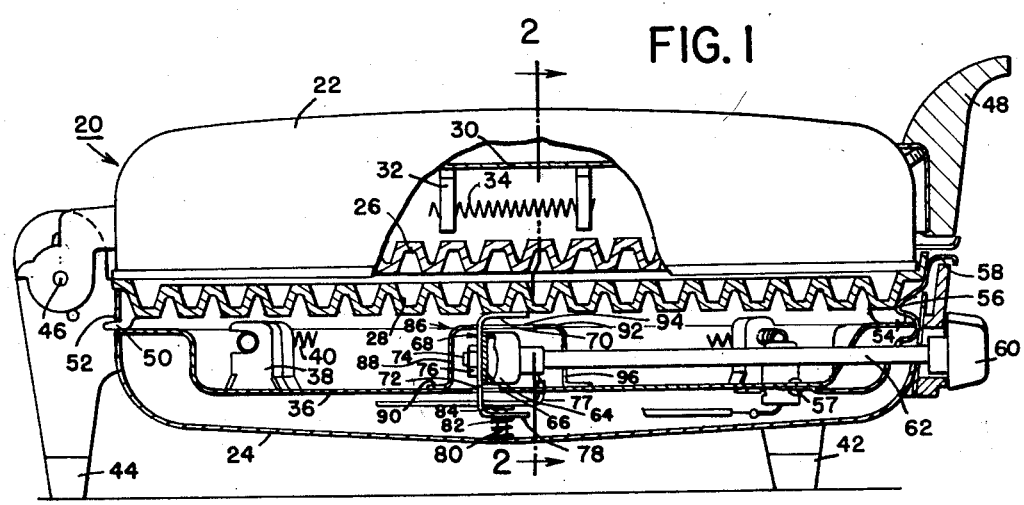

As illustrated in Fig. 1, the present invention is incorporated in a cooking appliance 20 of the waffle baker-sandwich grill type. This appliance includes upper and lower casing portions 22 and 24, respectively. Each of these casings is provided with a removable cooking plate such as the waffle grids 26 and 28. Within the upper casing 22, a heating element supporting tray 30 carries insulating members 32 on which an electrical heating element 34 is mounted. This heating element radiates heat to the upper waffle grid 26 to provide the desired cooking temperature.

Similarly, within the lower casing 24, a heating element supporting tray 36 is mounted. This tray in turn carries insulating members 38 on which the electrical heating element 40 is supported.

Figure 2:
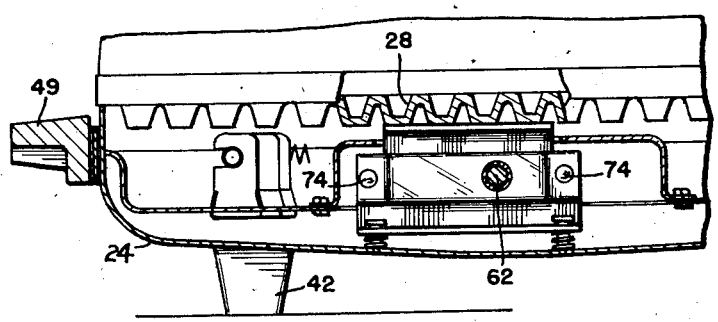
Fig. 2 is a partial sectional view on the line 2—2 of Fig. 1.

The appliance itself is spaced above a table or other supporting surface by front legs 42 and rear legs 44. The rear legs 44, in turn, may carry hinge means, indicated generally at 46, by which the upper casing 22 is pivotally mounted with respect to the lower casing in known manner. The handle 48 on the forward edge of upper casing 22 facilitates movement of the upper casing from the closed or cooking position of Fig. 1 to at least one angularly spaced position in which the cooking surfaces are substantially separated. Handle 48 may serve as a supporting leg for the upper casing 22 in case the upper casing is opened 180° to locate the respective cooking surfaces in substantially a common horizontal plane. Lower casing 24 may be provided with side handles 49, as illustrated in Fig. 2, as a convenient means for lifting and moving the appliance.

The waffle grids 26 and 28 are removably mounted in their respective casings 22 and 24 in any known or desired manner to permit their ready removal when use of a different cooking surface is desired. Thus, a flat sandwich grill might be substituted for the waffle grids when grilling or similar cooking operations are desired.

By way of illustration, the lower waffle grid 28 is shown as provided with a retaining hook 50 at its rear edge, for engagement in a retaining slot 52 in the rear wall of lower casing 24. The front edge of the waffle grid 28 carries an upwardly facing latching shoulder 54 which is engaged by the latching portion of a pivotally mounted latch member 56 having a handle portion 58 located at the forward edge of the grid for convenient manipulation by the operator. The latch 56 is pivotally secured to the lower element tray 36 as illustrated, for example, by rivets 57. The particular latching arrangement for the removable cooking plate forms no part of the present invention, but the latching arrangement shown constitutes the subject matter of a co-pending application of the present inventors, Ser. No. 297,262, filed July 5, 1952, assigned to the same assignee as the present invention.

To control the temperature of the cooking surfaces of the appliance, a thermostat control knob 60 is located at the forward side of the lower casing 24. Control knob 60 is mounted on the outer end of a control shaft 62 which extends inwardly into the casing in a plane substantially parallel to the plane of the cooking plate, i. e., substantially horizontal. The inner end of control shaft 62 serves for adjustment of one of the switch contacts of a thermally responsive switch indicated generally at 64. While various types of thermally responsive switches may be utilized, switch 64 is illustrated as having a thermally responsive plate or member 66 extending in a substantially vertical plane. The internal details of switch 64 may be substantially similar to those illustrated in the switch in Fig. 9. The relative arrangement of parts in such a switch necessarily locates the thermally responsive plate 66 in a plane perpendicular to the control shaft 62, to simplify the adjusting mechanism of the switch. This requirement, in turn, places the thermally responsive plate 66 in a plane angularly related to the cooking surface 28, so that it is impossible without extra linkages to place the plate 66 in the plane of cooking surface 28 for direct heat-conducting engagement therewith.

The present invention accordingly contemplates the provision of a conducting member of relatively high thermal conductivity, this conducting member being indicated generally at 68. The thermal conducting member 68 includes first and second angularly related portions 70 and 72, respectively. The portion 70 in this instance is substantially horizontal and lies in the plane of the bottom surface of cooking plate 28. Thus a substantial area of the portion 70 will be in direct thermal contact with the cooking plate 28 so that bracket 68 will accurately reflect the temperatures of the cooking surface.

The second angularly related portion 72 of the conducting bracket 68 lies substantially in the vertical plane of the thermally responsive plate 66 of control switch 64. Thus a substantial area of this second portion 72 is in direct thermal engagement with the thermally responsive plate 66. The construction accordingly provides a direct heat-conducting path, of a material of relatively high thermal conductivity such as copper or aluminum, between the cooking surface 28 and the thermally responsive plate 66 of the control switch. The control switch 64 is preferably directly mounted on the second portion 72 of the conducting bracket 68 by means of bolts 74 and nuts 76. Thus firm contact between the thermally responsive plate 66 and the second angular portion 72 of the conducting bracket is assured.

Suitable leads 77 connect the thermally responsive switch 64 in circuit with the heating elements 34 and 40 of the upper and lower casing. Thus the main heating elements of the appliance will be energized and deenergized in response to changes in the temperature of thermally responsive plate 66. These changes of temperature, in turn, will closely follow the changes in temperature of the cooking surface 28 by virtue of the high heat conductivity and good engagement of the bracket 68 with both the cooking surface and the plate 66.

To support the thermally responsive switch 64 in position so that the upper bracket portion 70 will at all times engage the lower surface of cooking plate 28, the heat-conducting bracket 68 has a lower horizontal flange 78. This lower flange 78 is vertically movable on the supporting stud 80 secured to the lower casing 24. Stud 80 has a head or shoulder 84 at its upper end to limit upward movement of the bracket portion 78, while a spring 82 between bracket 78 and the lower casing urges the conducting bracket 68 resiliently upwardly at all times. The head 84 of stud 80 permits upward movement of the bracket far enough to insure engagement of the upper bracket portion 70 with any cooking plate which may be inserted in the appliance, regardless of manufacturing variations in the dimensions of the plates or brackets. When the cooking plate 28 is in position, upward movement of bracket 68 by spring 82 will thus be normally limited by engagement of the first bracket portion 70 against the bottom of the cooking plate 28.

Thus in this first embodiment of the invention, the thermally conducting member 68 is in substantially the form of a U-shaped bracket, with one leg of the U engaging the cooking plate, the other leg of the U engaging the resilient supporting means, and the base of the U supporting the thermostat itself.

Figure 3:
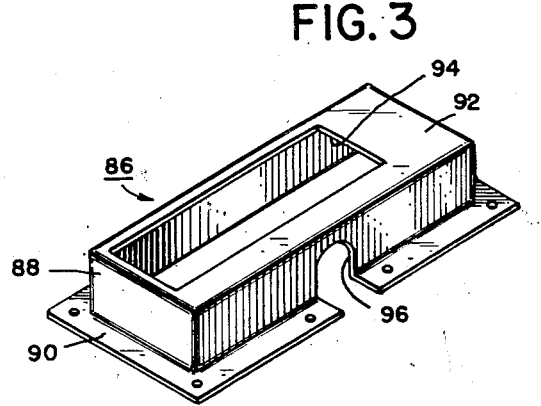
Fig. 3 is a perspective view of one form of shielding means for the thermal control switch of the device of Figs. 1 and 2.

According to another feature of the present invention, it is important to limit the response of the thermal switch 64 to the temperatures of the cooking surface 28. For this purpose a shield 86 is provided to minimize radiation of heat from the heating element 40 to the thermal conducting bracket 68. Shield 86 is illustrated in Fig. 3 and includes substantially vertical side and end walls 88, and a horizontal outwardly projecting supporting flange 90, as well as a top surface 92. The top surface 92 is provided with an opening 94 through which the upper portion 70 of the thermal conducting bracket 68 may project for engagement with the cooking plate. The lower supporting flange 90 is riveted or screwed to the heating element supporting tray 36. Thus the various walls of this shield member 86 prevent direct radiation of heat from the heating element wires 40 to the conducting bracket 68. Bracket member 68, and the thermally responsive plate 66 of the control switch 64, are thus responsive primarily to the temperature conditions of the cooking surface 28. It will be noted that this shield 86 includes a slot 96 in its front wall and supporting flange. This slot 96 permits passage of the control shaft 62 of the thermostatic switch.

In Figs. 4, 5, and 6, another embodiment of the invention is shown, in which a different arrangement of the thermally conducting bracket is utilized. Here the thermally conducting member is also resiliently supported, and it is formed in such a way as to provide a shielded chamber for a thermally responsive switch in which the thermally responsive portion has a strip of bimetal, as distinguished from the expanding plate of the previous embodiment. Appliance 98 includes lower and upper casings 100 and 102, respectively. Each casing is provided with a removable cooking surface such as the removable waffle grid 104 of the lower casing.

In this embodiment, the thermally responsive switch 106 is secured by a screw 108 to the vertical portion 110 of the combination heat conducting bracket and shield member 112. This member has a horizontal top surface 114 for direct engagement with the undersurface of cooking grid 104 and is made of material of high thermal conductivity just as in the previous case, to insure good heat transmission from the cooking grid to the thermostat. As an additional shield for the thermal switch 106, to protect it from heat radiated directly from the heating element of the lower casing, member 112 also has a front wall 116 extending downwardly from the top surface 114 and thus enclosing the opposite side of the thermostat.

This front wall 116 is provided with a slot 118 through which the control shaft 120 of the thermostat may project. A control knob 122 at the outside of the casing is connected to one end of the control knob, while the other end is enlarged as shown at 123 for engagement with the shaft 124 on the thermostat itself. The conducting and shielding member 112 also has end walls 161 as shown in Fig. 5, thus completely enclosing the thermally responsive switch and providing a chamber in which the temperature conditions closely reflect those of the bottom surface of the cooking plate by virtue of the engagement between the top 114 of the member 112 and the plate.

The details of construction of the thermally responsive switch are shown in Figs. 4 and 6. Here the thermally responsive portion of the switch is a strip of bimetal 126 oriented in a plane substantially perpendicular to the plane of the cooking plate 104. This bimetal strip 126 is rigidly supported at one end against the enlarged shoulder 128 of a supporting and heat-conducting stud 130 on which the various parts of the thermal switch are assembled. Stacked on this stud 130, with suitable spacing and insulating members, are first and second switch contact arms 132 and 134. The contact arm 134 projects beyond the arm 132 and is engaged by an insulating member 136 at the outer end of the bimetal strip to open the switch in response to predetermined temperature conditions. The operating temperature of the switch may be varied by changing the position of the contact arm 132 through the medium of an insulating button 138 on the end of the adjusting shaft 124. This adjusting shaft 124 is in threaded engagement with a boss 140 on a rigid supporting arm 142 at the end of stud 130 opposite the bimetal. Stud 130 may be rolled over, or in effect crimped, as shown at 144 to retain the various parts of the thermal switch in assembled relation.

The rigid supporting arm 142 has an offset portion 146 from which an integral lug 148 projects as a guide to steady the operating shaft 124. The outer end of this rigid supporting arm extends back parallel to stud 130 as shown at 150 and has a return bent portion 152 at the end. This return bent portion serves as the mounting and support for an adjustment member 154 designed to engage the outer end of contact arm 134 and determine the "off" position of the switch. An opening 156 in wall 110 of the conducting and shielding bracket 112 permits access to the adjusting member 154 without complete disassembly of the bracket from the switch.

To retain the assembled switch parts in appropriate position with respect to the conducting bracket and cooking plate, the stud 130 is internally threaded at 158. A bolt or screw 108 (Figs. 4 and 6) thus engages this threaded portion 158 and clamps the shouldered end 128 of stud 130 firmly against the wall 110 of the conducting member. Thus there is a direct metallic heat-conducting path from the upper surface 114 of the conducting bracket through the rear vertical wall 110 to the shouldered area 128 and the corresponding area of the bimetal.

To maintain the upper surface 114 of conducting bracket 112 in close heat-conducting engagement with the cooking plate, the unit is resiliently supported, somewhat like the first embodiment of the invention. Here the end walls 161 of the bracket have outwardly projecting flanges 160 provided with openings through which vertical supporting studs 162 may project. Studs 162 are secured to the lower casing 100. Suitable springs 164 between the casing and flanges 160 urge the casing upwardly against the cooking surface. A locking or retaining collar 166 on the upper end of each stud 162 limits the vertical movement of the conducting bracket and maintains the parts in assembled relation. Thus the bracket 112 not only serves to provide a direct heat-conducting metallic path from the cooking surface 104 to the thermally responsive bimetal strip 126, but various wall portions of this bracket also shield the bimetal from direct radiation of the electric heating elements for the lower casing.

Figs. 7, 8, and 9 illustrate a further modification constituting a preferred form of the present invention which provides additional shielding or insulation for the thermally conducting bracket. Here the lower appliance casing 168 has a removable cooking plate 170 just as in the previous case. The thermal switch 64 is identical to that used in the embodiment of Figs. 1 to 3 and is adjusted by means of the control shaft 62. The heating element supporting tray 172 is mounted within casing 168.

In this embodiment of the invention, the heat conducting bracket 174 has a first portion 176 lying in the plane of cooking plate 170 and having a substantial area in direct heat-conducting engagement therewith. Bracket 174 is of highly heat-conductive material and includes a second or perpendicular portion 178 having a substantial area in direct engagement with the thermally responsive member 66 of the switch (Fig. 9).

To support the thermal switch assembly within the casing, an angular supporting bracket 180 is provided. This bracket includes a vertical portion 182 substantially parallel to and spaced slightly from the vertical portion of the heat-conducting bracket 174. Bracket 180 also has a horizontal flange portion 184 which is vertically slidable on the posts of studs 186 in the bottom wall of the casing 168. Springs 188 urge the flange 184 and associated parts upwardly, thus maintaining the portion 176 of the heat-conducting bracket in direct engagement with the lower surface of the cooking plate 170. Supporting studs 186 are provided with shoulders or retaining collars 190 limiting the upward movement of the assembly.

According to an important feature of the invention, a layer of insulation 192 is provided between the vertical flange 182 of the supporting bracket 180 and the parallel flange 178 of the thermally conducting bracket. This insulating layer 192 not only prevents conduction of heat from the casing upwardly through the supporting bracket to the thermally responsive switch, but also insures that the heat conducted downwardly from the cooking surface 170 by bracket 174 will substantially all reach the thermally responsive portion 66 of the switch. The insulation 192 thus prevents dissipation of heat to the support and casing and further insures a highly accurate response of the thermally responsive switch portion 66 to the actual temperatures of the cooking surface 170. Bolts 194 and nuts 196 maintain the thermal switch, heat-conducting bracket, and supporting member in their assembled poistions.

The details of the switch itself are shown in Fig. 9, from which it is apparent that the thermally responsive plate 66, which is a member of relatively high thermal expansion characteristics, carries an arch member 198 of relatively low thermal expansion characteristics. The ends of this arch are secured to the ends of the high expansion plate so that expansion and contraction of plate 66 will cause the central portion of arch 198 to move toward and away from the plate.

This movement will control the position of one of the switch contact arms 202, which is engaged by an insulating button 200 at the center of arch 198. The position of the other switch contact arm 204 is controlled by an insulating point 206 on the end of the thermostat adjusting shaft 208. This adjusting shaft portion is threaded into the boss 210 on the top of the thermostat casing 212. Contact arms 202 and 204 are also supported from this casing at 214 and 216, where they are connected to the leads 67 for controlling the heating circuit of the appliance in known manner.

The ends walls of casing 212 are secured by bolts 218 to upturned flanges at the ends of the thermally responsive control plate 66.

The end walls of the casing also have outwardly projecting flanges 220 for engagement by the bolts 194 which maintain the switch in assembled position with respect to the thermal conducting bracket portion 178, insulating layer 192, and supporting member 182. As pointed out above, the use of this insulating layer further insures that the thermally responsive plate 66 of the thermal switch will be governed directly and primarily by the temperatures of the cooking plate as transmitted through the highly conductive bracket. The parts are further shielded by the housing—just as in the device of Figs. 1 to 3.

Figure 10:
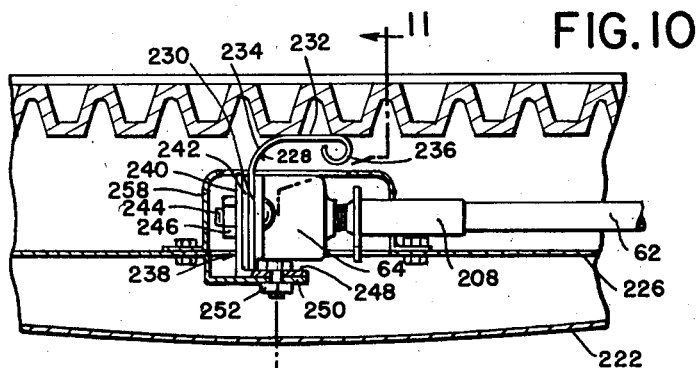
Fig. 10 is a partial side elevation similar to Fig. 1 showing a modified form of support and heat-conducting bracket according to the invention.
Figure 11:
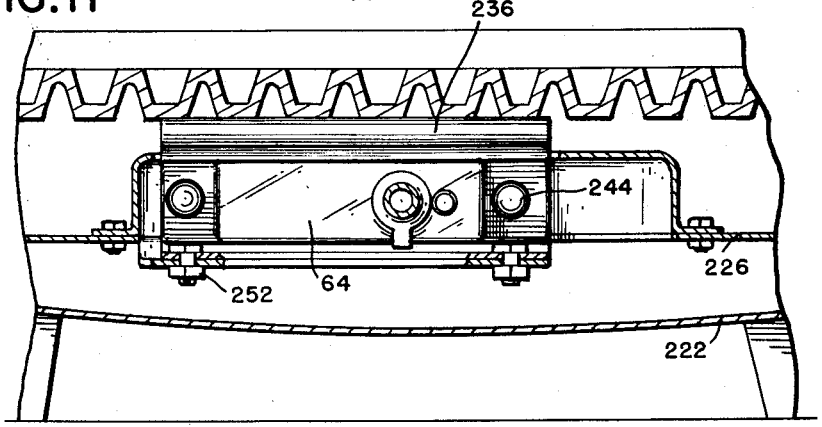
Fig. 11 is a partial sectional view on the line 11—11 of Fig. 10.
Figure 12:
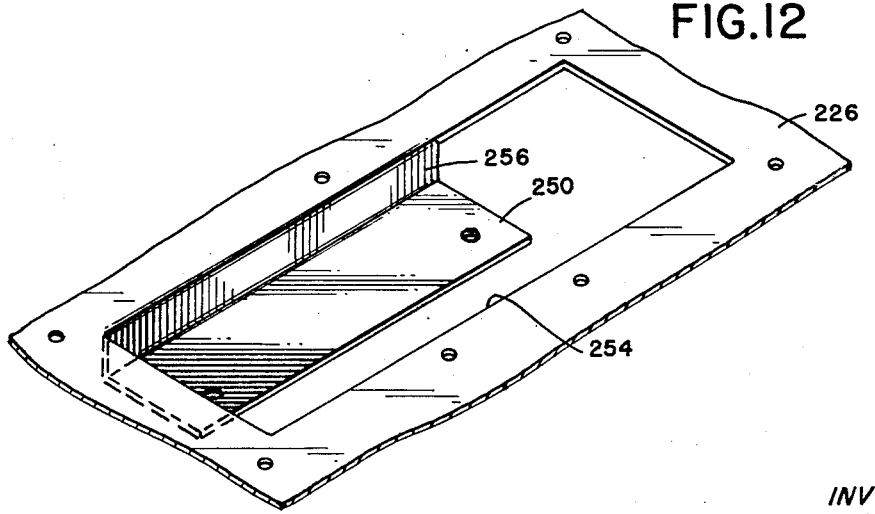
Fig. 12 is a partial perspective view of a portion of the heating element supporting tray of Fig. 10 showing the manner in which it is modified to support the thermally responsive switch.

Figs. 10, 11, and 12 illustrate another modification of the present invention which is basically similar to the device of Figs. 7, 8, and 9, except that the supporting bracket for the thermostat assembly is mounted directly on the heating element supporting tray, rather than being resiliently supported on the casing. Here the appliance has a lower casing 222 and removable cooking plate 224, with a heating element supporting tray 226 just as in the previous cases. Thermostat 64 and its control shaft 62 are identical with the correponding parts in Figs. 7, 8, and 9.

In this case, the thermally conducting member 228 includes a substantially vertical portion 230 in close heat-conductive engagement with the thermally responsive plate of the switch 64. A second substantially flat area 232 extends horizontally for engagement with the undersurface of the cooking plate 224. Between these two areas 230 and 232, the thermally conducting bracket includes a spring arch portion 234, the outer end of the bracket being curled under itself slightly as shown at 236.

Bracket member 228, as suggested above, not only consists of material having relatively high thermal conductivity, but is also sufficiently resilient to urge the upper flat area 232 upwardly in contact with the cooking plate 224 at all times. The thermostat and conducting bracket are carried by a supporting member 238 similar to that of the previous embodiment and having a vertical flange portion 240 separated by an insulating layer 242 from the portion 230 of the heat-conducting member. Bolts 244 and nuts 246 maintain the thermal switch 64, conducting bracket, insulating layer and supporting bracket in their relative assembled positions.

Supporting bracket 238 has a horizontal lower flange 248 which is supported, in this case, directly on a downwardly offset horizontal flange 250 of element tray 226. Bolts 252 secure the supporting bracket 238 to this downwardly offset flange, with the supporting bracket projecting upwardly through opening 254 in the tray 226. The vertical wall portion 256 joins the tray body to the downwardly offset supporting flange 250 as shown in Fig. 12.

Also supported on the element tray 226 is a housing 258 substantially similar to the housing shown in Fig. 3. This housing further shields and protects the thermal switch assembly from direct radiation of the heating element. Thus in this embodiment of the invention, just as in the embodiment of Figs. 7, 8, and 9, both the housing and the supporting bracket assist in shielding the conducting member and thermal switch from direct radiation from the heating elements, while the interposed insulating layer offers further protection in this respect and also prevents conduction of heat from the thermal conducting bracket to the support and casing. Thus close response of the switch to the temperature conditions of the cooking plate is maintained.

Figure 13:
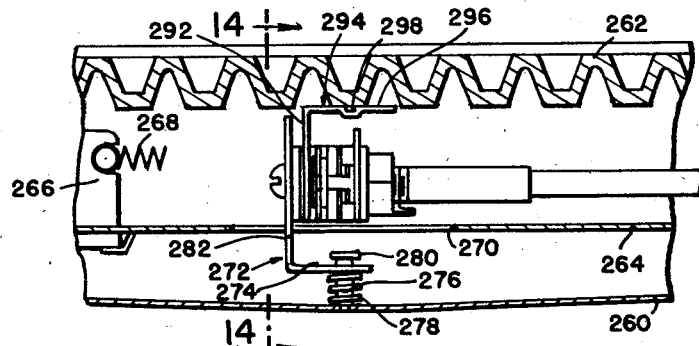
Fig. 13 is a partial side elevation, primarily in section, similar to Fig. 1 showing details of a further modification of the invention.
Figure 14:
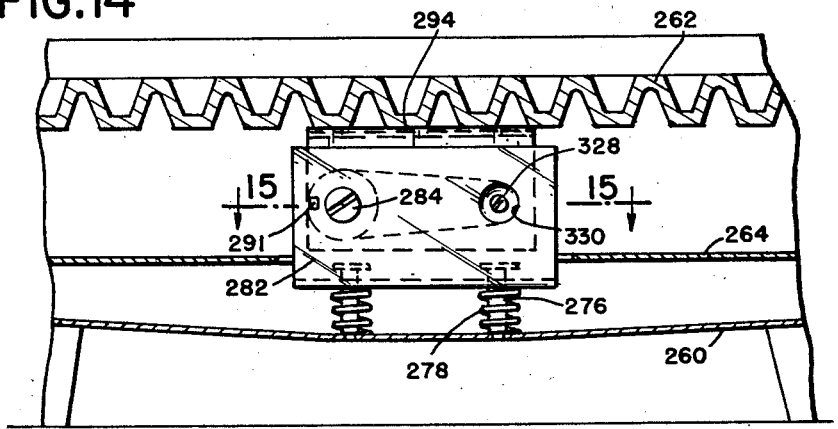
Fig. 14 is a sectional view on the line 14—14 of Fig. 13.
Figure 15:
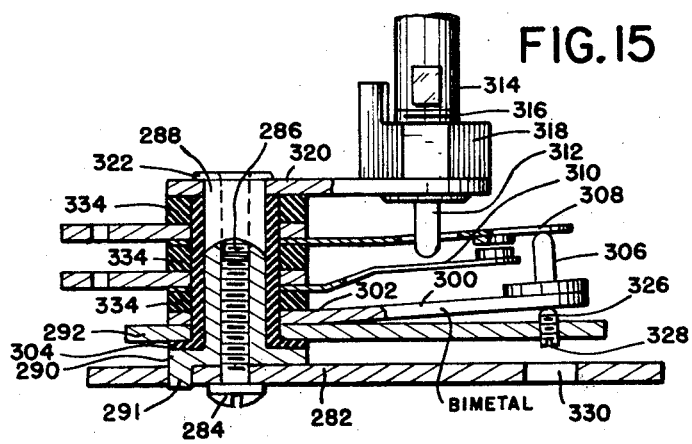
Fig. 15 is a sectional view on the line 15—15 of Fig. 14, showing details of the thermal switch utilized in this embodiment of the invention.

Figs. 13, 14, and 15 illustrate another preferred embodiment of the invention in which a bracket of high thermal conductivity has one portion in engagement with the cooking plate, and another portion in engagement with a substantial area of the thermally responsive portion of a thermostatic switch assembly. In this preferred embodiment the heat-conducting bracket and thermally responsive member are in close heat-conducting engagement with each other over a large area, but are substantially insulated from other portions of the assembly to minimize the possibility of heat transfer in other directions. As shown in Fig. 13, the lower casing 260 is provided with a removable cooking plate 262 and a heating element supporting tray 264. Insulating supports 266 on the tray carry an electric heating element 268, just as in the previous cases. Here the heating element tray 264 has an opening 270 through which the thermostat assembly projects. A supporting bracket 272 for this assembly has a horizontal lower flange 274 which is vertically movable on supporting studs 276 in the bottom wall of the casing. Springs 278 urge the supporting bracket upwardly, and a retaining collar or shoulder 280 on the upper end of each stud prevents excessive vertical movement of the bracket.

Supporting bracket 272 has a vertical flange portion 282 to which the thermostat assembly is secured by means of a bolt 284. Bolt 284 is screwed into the internally threaded portion 286 of a supporting stud 288 on which the thermostat parts are stacked and assembled.

This stud is provided with an enlarged head or shoulder 290 at one end. A projection 291 on the head engages a slot in the support flange 282 to prevent relative rotation of the parts. In this case the thermally conducting bracket has a vertical flange portion 292 which is directly mounted on stud 288 as part of the thermostatic switch subassembly. The thermally conducting bracket 294 also includes a horizontal upper portion 296 for engagement with the bottom surface of the cooking plate 262 under the tension of springs 278. This surface 296 may be embossed as shown at 298 to strengthen the flange and insure a flat surface for engagement with the cooking plate.

Details of the switch itself are shown in Fig. 15 wherein the thermally responsive member of the switch is in the form of a bimetal strip 300. A substantial area at one end 302 of the strip 300 is in direct heat-conducting engagement with the portion 292 of heat-conducting bracket 294 immediately adjacent the supporting stud 288. In fact all portions of the bimetal are either in contact with or very closely adjacent the portion 292. Thus the temperature conditions of the bracket portion 292 will directly control the temperature of the bimetal strip 300 and thus influence the operation of the thermal switch in direct response to the temperature conditions of the cooking plate as transmitted to the conducting bracket 294.

In order to prevent the heat transmitted from the plate 262 through bracket 294 to bimetal 300 from being dissipated to other parts of the assembly, insulating material 304 is interposed between the shouldered end 290 of the switch-supporting stud 288 and the conducting bracket portoin 292. Thus, just as in the embodiments of Figs. 7 to 9 and 10 to 12, the heat from the conducting bracket reaches the thermaly responsive member immediately, but has no metallic path through which its temperature characteristics can be dissipated to the supporting structure for the thermostat.

An insulating member 306 at the outer end of bimetal strip 300 engages one of the switch contact arms 308 and controls its position. The other switch contact arm 310 determines the operating temperature of the switch through engagement with the insulating button 312 on the end of adjusting shaft 314. This adjusting shaft 314 has a threaded section 316 screwed into a supporting hub 318 on the rigid supporting arm 320 of the thermostat assembly. This arm 320 in turn is carried by stud 288 which may be rolled over or riveted to retain the parts in assembled position as indicated at 322. The assembly includes suitable insulating elements 324 which insulate the contact arms electrically from each other and from the remainder of the assembly.

To determine the "off" position of the switch, an adjustable stop 326 is threaded directly into the heat-conducting bracket portion 292. One end of member 326 is provided with an adjusting slot 328 which is accessible through an opening 330 in the supporting bracket flange 282.

In this embodiment of the invention, the heat-insulating washer 304 limits the dissipation of heat from the bracket portion 292 as suggested above, and prevents the operating temperature of the bimetal strip 300 from being substantially affected by the temperature of the switch-supporting stud 288 or the shoulder 290 at one end thereof. As shown particularly in Figs. 13 and 14, the flange 282 of the supporting bracket extends upwardly and laterally far enough to shield the conducting bracket 294 substantially from direct radiation of the heating elements. A further protective housing such as that illustrated in Fig. 3 may be utilized if additional shielding is needed, but may be unnecessary in certain cases depending upon the actual relative location of the thermal switch assembly with respect to the main heating element wires.

According to the foregoing description, a cooking appliance and a thermally responsive switch assembly for such an appliance have been provided which substantially accomplish the objects set forth at the beginning of this specification. Since minor variations and changes in the exact details of construction will be apparent to persons skilled in this field, it is intended that this invention shall cover all such changes and modifications as fall within the spirit and scope of the attached claims.

Now, therefore, we claim:

1. A cooking appliance having a casing, a cooking plate removably mounted on the casing, electric heating means for said plate, and a thermal switch assembly including switch contacts in circuit with the heating means, a thermally-responsive member located in a plane angularly intersecting the plane of the cooking plate and controlling said contacts, and a heat-conducting member having angularly related first and second portions the first portion being in the plane of the cooking plate and in good heat-conducting engagement with a substantial area of said plate, and the second portion being in the plane of said thermally responsive member and in good heat-transferring engagement therewith.

2. A cooking appliance having a casing, a cooking plate removably mounted on the casing, electric heating means for said plate, and a thermal switch assembly including switch contacts in circuit with the heating means, a thermally-responsive member located in a plane angularly intersecting the plane of the cooking plate and controlling said contacts, and a heat-conducting member having angularly related first and second portions, the first portion being in the plane of the cooking plate and in good heat-conducting engagement with a substantial area of said plate, and the second portion being in the plane of said thermally responsive member and in good heat-conducting engagement with a substantial area thereof.

3. A cooking appliance according to claim 2 in which the conducting member includes a plurality of walls depending from the first portion and substantially enclosing and shielding said thermal switch assembly, said second portion constituting at least part of one depending wall.

4. A cooking appliance having an open-mouthed casing, a cooking plate removably mounted across the mouth of the casing, an electric heating element mounted within the casing for heating the plate, and a thermal switch assembly including switch contacts in circuit with the heating element, a thermally responsive strip member located in a plane substantially perpendicular to the plane of the plate and controlling said switch contacts in response to changes in temperature of the strip, a conducting member of relatively high thermal conductivity having perpendicular first and second portions with the first portion extending in the plane of the cooking plate and in good heat-conducting engagement with a substantial area of the plate, and the second portion extending alongside a substantial area of the thermally responsive member and in good heat-transferring relation therewith, and shielding means located in said casing between the heating element and at least one of said thermally responsive and conducting members.

5. A cooking appliance according to claim 4 having a supporting member on which the thermal switch assembly is carried, said shielding means including a member of heat-insulating material positioned between the heat-conducting member and support member.

6. A cooking appliance according to claim 4 having a supporting member on which the thermal switch assembly is carried, said supporting member including a flange portion extending along the second portion of said conducting member on the opposite side of said conducting member from said thermally responsive member, and said shielding means including a layer of heat-insulating material positioned between said second portion of the heat conducting member and said supporting member flange portion.

7. A cooking appliance according to claim 4 in which the shielding means extends around both the thermally responsive and conducting members and is supported within the casing independently of said members.

8. A cooking appliance according to claim 7 in which the thermal switch assembly includes manual adjusting means accessible externally of the casing, and an internal setting member, the shielding means having an opening through which the setting member is accessible and adjustable when the cooking plate is removed.

9. A cooking appliance having an open-mouthed casing, a cooking plate removably mounted across the mouth of the casing, a heating element supporting tray within the casing and spaced from the plate, a heating element supported by the tray between the tray and plate for heating the plate, a thermal switch assembly including switch contacts in circuit with the heating element, a thermally responsive strip member located in a plane substantially perpendicular to the plane of the plate and controlling said switch contacts and heating element in response to changes in temperature of the strip member, a conducting member of relatively high thermal conductivity having angularly related first and second portions with the first portion parallel to the plane of the cooking plate and the second portion extending alongside a substantial area of the thermally responsive member and in good heat-transferring relation therewith, and means resiliently urging said first portion into heat-conducting engagement with a substantial area of the cooking plate.

10. A cooking appliance according to claim 9 in which said thermal switch assembly is fixed within the casing and said resiliently urging means includes a resilient section in said conducting bracket between said first and second portions.

11. A cooking appliance according to claim 10 including a fixed support member having a vertical flange parallel to and adjacent the second portion of the conducting member, a layer of heat insulation between the vertical flange and second portion, and means securing the vertical flange, insulation layer, second portion and thermally responsive strip in assembled relation in the aforesaid order, thereby minimizing heat transfer between the support member on the one hand and the conducting member and thermally responsive strip on the other hand.

12. A cooking appliance according to claim 9 in which said thermal switch assembly is resiliently supported on said casing, said element tray has an opening through which the resiliently supported switch assembly projects, and said tray also carries a shielding member having vertical walls around said opening, said walls shielding the conducting member and thermally responsive strip member from direct radiation of the heating element.

13. A cooking appliance having a casing, a cooking plate removably mounted on the casing, electric heating means for said plate, and a thermal switch assembly including switch contacts in circuit with the heating means, a thermally responsive member having a surface of substantial area located in a plane generally perpendicular to the plane of the cooking plate and controlling the switch contacts in response to change in temperature of the member, a conducting member of relatively high thermal conductivity having perpendicular first and second portions, with the first portion extending in the plane of the cooking plate and in good heat-conducting engagement with a substantial area of the plate when the plate is on the casing, and the second portion extending immediately adjacent a substantial area of said thermally responsive member, and means securing the thermally responsive member to said second portion and insuring good heat-conducting engagement between them.

14. A cooking appliance according to claim 13 in which said conducting member has a third portion projecting from the second portion in a plane generally parallel to the first portion, and means connected to said third portion for supporting the conducting member within the casing and urging it toward said plate.

References Cited in the file of this patent

UNITED STATES PATENTS

| | | |
|---|---|---|
| 2,009,790 | Shroyer | July 30, 1935 |
| 2,148,407 | Pierson | Feb. 21, 1939 |
| 2,250,966 | Propernick et al. | July 29, 1941 |
| 2,267,387 | Winborne | Dec. 23, 1941 |
| 2,311,087 | Sandell | Feb. 16, 1943 |
| 2,342,077 | Jepson | Feb. 15, 1944 |
| 2,361,285 | Gough | Oct. 24, 1944 |
| 2,427,944 | Clark | Sept. 23, 1947 |
| 2,440,025 | Singleton | Apr. 20, 1948 |
| 2,598,081 | Sway | May 27, 1952 |